United States Patent [19]

Hunt

[11] Patent Number: 4,880,550

[45] Date of Patent: Nov. 14, 1989

[54] PREPARATION OF HIGH BASE CALCIUM SULFONATES

[75] Inventor: Mack W. Hunt, Naperville, Ill.

[73] Assignee: Amoco Corporation, Chicago, Ill.

[21] Appl. No.: 237,146

[22] Filed: Aug. 26, 1988

[51] Int. Cl.$^4$ ................. C10M 135/10; C10M 125/22
[52] U.S. Cl. ......................................... 252/33; 252/25; 252/33.4
[58] Field of Search ...................... 252/18, 25, 33, 33.4

[56] References Cited

U.S. PATENT DOCUMENTS

| | | | |
|---|---|---|---|
| 4,387,033 | 6/1983 | Lenack et al. | 252/25 |
| 4,749,499 | 7/1988 | Damin et al. | 252/25 |
| 4,758,360 | 7/1988 | Bernasconi et al. | 252/33 |
| 4,780,224 | 10/1988 | Tze-Chi Jao | 252/33 |

*Primary Examiner*—Jacqueline V. Howard

*Attorney, Agent, or Firm*—Matthew R. Hooper; William M. Magidson; Ralph G. Medhurst

[57] ABSTRACT

A method for preparing a carbonate overbased calcium sulfonate, which method comprises the steps of:

(1) forming an initial mixture of a lower molecular weight alkanol, an alkyl or alkaryl substituted sulfonic acid or sulfonate compound, a diluent and a solvent; (2) adding a basic calcium compound to the initial mixture to form a second mixture in which the amount of added calcium is at least about ten times the amount necessary to form a neutral calcium sulfonate; (3) heating the second mixture to reflux temperature; (4) carbonating the second mixture at said reflux temperature to form a carbonated product while simultaneously and continuously removing water produced by the carbonation reaction; (5) after carbonation is stopped, heating the carbonated product to an elevated temperature sufficient to remove the alkanol; and (6) removing solids and solvent from the carbonated product.

5 Claims, No Drawings

PREPARATION OF HIGH BASE CALCIUM SULFONATES

CROSS-REFERENCE TO RELATED APPLICATIONS

There has been disclosed in a concurrently filed application, U.S. Ser. No. 07/237,150, a method for preparing an overbased alkali metal sulfonate, wherein a mixture of an alkali metal compound, a lower molecular weight alkanol having from one to four carbon atoms, a diluent, a solvent, and a sulfonate compound is formed; the mixture is heated to a temperature of at least 104° C. (220° F.) for a period of time that is sufficient to remove essentially all of the alkanol as overhead, solvent that is removed along with the alkanol being replaced; the heated mixture is carbonated at a temperature of at least 104° C. (220° F.) to form a carbonated product, the water of reaction that is formed being removed continuously as overhead; the carbonated product is heated to an elevated temperature to remove any residual water of reaction therefrom; and the essentially water-free carbonated product is treated for removal of solids and residual solvent. The carbonated product is the overbased alkali metal sulfonate, is haze free, and is a suitable detergent additive for lubricating oils that are used in internal combustion engines.

BACKGROUND OF THE INVENTION

Field of the Invention

This invention relates to a method for preparing highly basic carbonate overbased calcium sulfonates useful as detergent additives n lubricating oils for internal combustion engines. More particularly, it relates to a method for preparing highly basic calcium sulfonates having metal ratios of at least about 10 and preferably about 12 to 15 which method comprises the steps of: (1) forming an initial mixture of a lower molecular weight alkanol, an alkyl or alkaryl substituted sulfonic acid or sulfonate compound, a diluent and a solvent; (2) adding a basic calcium compound to the initial mixture to form a second mixture in which the amount of added calcium is at least about ten times the amount necessary to form a neutral calcium sulfonate; (3) heating the second mixture to reflux temperature; (4) carbonating the second mixture at said reflux temperature to form a carbonated product while simultaneously and continuously removing water produced by the carbonation reaction; (5) after carbonation is stopped, heating the carbonated product to an elevated temperature sufficient to remove the alkanol; and (6) removing solids and solvent from the carbonated product.

DESCRIPTION OF THE PRIOR ART

The use of normal salts of petroleum sulfonic acids as additives for lubricating oil compositions is well known. During World War II, normal metal sulfonates that were derived from mahogany or petroleum sulfonic acids were employed as detergent additives in internal combustion engine crankcase oils. Calcium or barium was employed as the metal in wuch sulfonates. Subsequently, sulfonate products which contained as much as twice as much metal as the corresponding metal sulfonate were found to have improved detergent power and ability to neutralize acidic contaminants and, hence, were used in the place of the normal sulfonates. More recently, fully oil-soluble sulfonates containing from three up to twenty or more times as much metal as a corresponding normal metal sulfonate have been developed. These high based sulfonates have been identified as "overbased", "superbased", and "hyperbased".

Over the years, numerous methods for preparing overbased sulfonate have been disclosed. In general, such overbased sulfonates have been prepared by mixing a promoter and a solvent with a normal sulfonate and an excessive amount of a metallic base of either an alkali metal or an alkaline earth metal, heating the resulting mixture, carbonating the resulting reaction mass with sufficient carbon dioxide to increse the amount of metal base colloidally dispersed as metal carbonate in the resulting product, and then filtering the resulting material. Several of the particular methods are summarized hereinbelow in the following paragraphs.

Le Seur U.S. Pat. No. 3,488,284 discloses a process for preparing oil soluble basic metal complexes formed by treating an oil soluble sulfonic acid with a metal base in the presence of an acidic gas and an alcohol promoter. The process of the patent is said to produce oil soluble metal containing compositions having "metal ratios" i.e., ratios of total metal in the product to the amount of metal which is in the form of the normal salt of the sulfonic acid, of up to about 7 or more. The only example in the patent using calcium is Example 11 which teaches a metal ratio of only about 2.9. Of the remaining forty-five examples the highest metal ratio of 12.2 (Example 46) required four carbonation cycles. Only three of the examples had metal ratios above 5. At column 7 the patent states:

> The process mass must be substantially anhydrous, that is, contain substantially no free water, during the step in which the mass is treated with the inorganic acidic material. If water is liberated during such step, as by the use of metal hydrate of the basically reacting metal hydrate of the basically reacting metal compound, the temperature and other conditions of reaction should be such that substantially all of such liberated water is driven off as it is formed.

It is evident however that the liberated water referred to in the above passage refers to liberated water of hydration and not water of reaction. The Le Seur patent does not disclose or suggest continuous removal of water of reaction as it forms during carbonation.

In U.S. Pat. No. 3,446,736, Herd, et al., disclosed the formation of a calcium sulfonate-calcium carbonate product by preparing a calcium carbonate reagent in methanol and reacting such reagent with a sulfonic acid or sulfonate salt. For example, the calcium carbonate reagent prepared by carbonating a suitable calcium inorganic compound in methanol with carbon dioxide at a temperature below about 30° C. (86° F.), was intermixed with a solution of a sulfonic acid or sulfonate in mineral oil. Then the resulting mixture was heated to a temperature above the boiling point of methanol to facilitate reaction and to remove methanol by distillation.

Le Seur U.S. Pat. No. 3,496,105, discloses in preparing an overbased material, that the compound to be overbased, e.g., an oil-soluble sulfonic cid or a sulfonate, a substantially inert organic solvent, a Group II metal base, an alcoholic or phenolic promoter, and an acidic material, such as $CO_2$, $H_2S$, $SO_2$, or $SO_3$, are mixed together. The patent discloses that the temperature at which the acidic material is contacted with the remainder of the reaction mass depends upon the promoting agent employed, the temperature ranging from about 80° C. (176° F.) to about 300° C. (572° F.). If an alcohol is used as a promoting agent, the temperature usually will not exceed the reflux temperature of the reaction mixture and preferably will not exceed about 100° C. (212° F.).

King et al. U.S. Pat. No. 3,907,691, discloses that the overbasing process can be conducted conveniently by mixing a neutral metal sulfonate and an inert hydrocarbon solvent, adding an alkaline earth metal base and an alkanol having one to four carbon atoms to the resulting mixture at a temperature and pressure effective in retaining most of the alkanol charged, contacting the reaction mixture with carbon dioxide until its absorption into the mixture ceases or substantially decreases, and heating the resulting product to strip out the residual alkanol and water of reaction.

Bakker U.S. Pat. No. 4,137,184, discloses the preparation of a Group II metal sulfonate carbonated with carbon dioxide at ambient temperature, e.g., 22° C. (71.6° F.) to 49° C. (120° F.), in the presence of solvent, methanol, and a Group II metal hydroxide for a period of time. The carbonates material is then heated to a higher temperature, e.g., 140° C. (284° F.) to 155° C. (311° F.) to remove solvent, methanol, and water. The carbon dioxide is passed through the mixture at a rate such that all the carbon dioxide is taken up without off-gas.

In United Kingdom Patent Application GB 2,082,619A, Lenack, et al., disclosed a process for the preparation of a highly basic calcium sulfonate, wherein a mixture of an oil-soluble sulfonic acid or alkaline earth metal sulfonate, calcium hydroxide, an alcohol having from one to four carbon atoms, an aromatic or aliphatic hydrocarbon solvent, and water is formed; the mixture is carbonated with carbon dioxide at a temperature that is maintained within the range of 25° C. (77° F.) to 30° C. (76° F.) until just prior to complete reaction of carbon dioxide with the calcium hydroxide, at which time further calcium hydroxide is added; carbonation is completed at a temperature within the range of from about 50° C. (122° C.) to 100° C. (212° F.) where from 5 wt % to 20 wt % of water, based on the weight of calcium hydroxide, is used; and the resulting mixture is heated to an elevated temperature, e.g., above 130° C. (266° F.) to remove water, alcohol, and solvent.

SUMMARY OF THE INVENTION

According to the present invention, there is provided a method for preparing a carbonate overbased calcium sulfonate which method comprises: (1) forming an initial mixture of a lower molecular weight alkanol, an alkyl (or alkaryl) substituted sulfonic acid or sulfonate compound, a diluent and a solvent; (2) adding a calcium compound to the initial mixture to form a second mixture in which the amount of added calcium is at least about ten times the amount necessary to form a neutral calcium sulfonate; (3) heating the second mixture to reflux temperature; (4) carbonating the second mixture at said reflux temperature to form a carbonated product while simultaneously and continuously removing water produced by the carbonation reaction; (5) after carbonation is stopped, heating the carbonated product to an elevated temperature sufficient to remove the alkanol; and (6) removing solids and solvent from the carbonated product. A preferred alkanol is methanol. Suitable solvents are hydrocarbons such as normal-hexane and normal-heptane. A suitable diluent is a low-viscosity lubricating oil.

The process of the present invention results in carbonate overbased calcium sulfonates having outstanding clarity. In addition, the process can use aliphatic solvents which are cheaper and easier to use than aromatic solvents.

DESCRIPTION AND PREFERRED EMBODIMENTS

Detergents are important components of lubricating oil compositions used in internal combustion engines. The most commonly used class of detergents are the carbonate overbased alkali or alkaline earth metal sulfonates. Such detergents are employed not only for their detergent properties, but also because their high basicity enables them to neutralize acidic contaminants in lubricating oil compositions.

According to the present invention, there is provided a method for preparing a carbonate overbased calcium sulfonate having a metal ratio of at least about 10 and preferably about 12 to 15. In the present invention the term metal ratio should be understood to denote the ratio of the total amount of calcium in the overbased carbonated calcium sulfonate to the amount of calcium which is required to form the normal metal salt of the sulfonate. The method of the present invention comprises: (1) forming a first mixture of a lower molecular weight alkanol, an alkyl or alkaryl substituted sulfonic acid or sulfonate compound, a diluent, and a solvent; (2) adding a calcium compound to said first mixture to form a second mixture in which the amount of added calcium is at least about ten times the amount necessary to form a neutral calcium sulfonate; (3) heating the second mixture to reflux temperature; (4) carbonating the second mixture at said reflux temperature to form a carbonated product while simultaneously and continuously removing as overhead water produced during carbonation as it is formed; (5) after carbonation is stopped, heating said carbonated product to remove said alkanol; and (6) treating said carbonated product to remove therefrom solids and solvent.

According to one embodiment of the method of the present invention, there is provided a method for preparing a carbonate overbased calcium sulfonate, which method comprises: (1) forming a first mixture of methanol, an alkyl sulfonic acid or alkaryl sulfonic acid, a hydrocarbon diluent, and a solvent; (2) adding calcium hydroxide to said first mixture to form a second mixture; (3) heating said second mixture to reflux temperature to obtain a heated mixture; (4) maintaining said heated mixture at reflux temperature while carbonating said heated mixture to form a carbonated product by introducing gaseous carbon dioxide into said heated mixture while water of reaction is removed continuously as overhead as it is formed, said carbonated products comprising carbonate overbased calcium sulfonate; (5) when the desired amount of carbonation has occurred, stopping carbonation and heating said carbonated product to remove methanol therefrom and (6) treating said carbonated product to remove solids and solvent therefrom.

The product resulting from the method of preparation of the present invention is a carbonate overbased calcium sulfonate. The term "overbased" is used synonymously with such terms as "basic" and "superbased". As used herein and in the appended claims, the term "overbased alkaline earth metal sulfonates" refers to those sulfonates which are characterized by having a stoichiometric excess of the alkaline earth metal component relative to the sulfonic acid component. Accordingly, a normal or neutral alkaline earth metal sulfonate would have a ration of chemical equivalents of alkaline earth metal to chemical equivalents of sulfonate ("metal ratio") of 1:1, while an overbased sulfonate would have a ratio of equivalents of alkaline earth metal to chemical equivalents of sulfonate that is greater than 1:1. the degree of overbasing of a sulfoante can be identified conveniently by stating the total base number (TBN) of the particular sulfonate. TBN expresses the number of milligrams of potassium hydroxide that would have the same acid neutralizing capacity as 1 gram of the overbased sulfonate.

According to the method of the present invention, there is first formed a mixture of various components. One of the components of this mixture is a lower molecular weight alkanol. Typically such lower molecular weight alkanol will have from 1 to 4 carbon atoms. The preferred alkanol is methanol. Other alkanols that are contemplated for use in the method of the present invention are ethanol, 1-propanol, isopropanol, and isobutanol.

Another component of the first mixture is an oil-soluble sulfonic acid or a metal salt of a sulfonic acid. Such sulfonic acids may be neutral or synthetic sulfonic acids, such as a mahogany or petroleum alkyl sulfonic acid. Both alkyl sulfonic acids and alkaryl sulfonic acids are contemplated. The alkyl sulfonic acids should have in the alkyl chain at least 18 carbon atoms and may contain as many as about 45 carbon atoms. Typically, sulfonic acids can be prepared by treating petroleum products with sulfuric acid or $SO_3$. The compounds in the petroleum product which becomes sulfonated contain an oil solubilizing group, such as hydrocarbyl groups, which are organic radicals composed of carbon and hydrogen except for minor amounts of other elements, such as oxygen, chlorine, and the like. The hydrocarbyl group can be an aliphatic, or an aromatic radical, or a radical which is a combination of an aliphatic and an aromatic radical. It is preferred that the hydrocarbyl group be relatively free of aliphatic unsaturation.

The calcium compound that is employed in the second mixture of the method of the present invention may be an oxide or a hydroxide of calcium. The preferred calcium compound is calcium hydroxide.

It is contemplated that for making 100 parts of the finished carbonate overbased calcium sulfonate product, the various compoennts of the reaction mixture can be employed in the following ranges. The sulfonic acid component can be used in an amount within the range of about 15 parts to about 35 parts. The diluent oil can be used in an amount within the range of about 16 parts to about 20 parts. The solvent can be present in the amount within the range of about 100 parts to about 500 parts. The alkanol, when methanol, can be present in an amount within the range of about 20 parts to about 80 parts. The calcium compound, preferably calcium hydroxide, can be used in an amount within the range of about 20 parts to about 50 parts. The carbonation medium, preferably carbon dioxide, can be used in an amount of about 20 parts to about 50 parts.

The solvent that is employed in the process or method of the present invention can be either an aliphatic solvent or an aromatic solvent. Therefore, solvents such as n-hexane, n-heptane, toluene, and xylene are suitable. However, the use of an aliphatic solvent is preferred since it minimizes processing complications which can occur when aromatic slvents are used. The aliphatic solvents can be used to sulfonate and to overbase. Moreover, aliphatic solvents are cheaper and are capable of being removed more easily from the reaction mass.

The carbonate overbased calcium sulfonate that is prepared by the method of the present invention can be used as a detergent and dispersatn in a lubricating oil composition. Suitable lubircating oils that are contemplated for use in such lubricating oils compostions are oils of lubricating viscosity derived from either petroleum sources or synthetic sources. The oils can be parafinic, naphthenic, halo-substituted hydrocarbons, synthetic esters, or combinations thereof. Such oils are those that are conventionally used in the manufacture of lubricants. Of course, the oils can be refined or otherwise processed to produce an oil having the quality desired.

A suitable lubricating oil composition will typically comprise a major proportion of the lubricating oil, e.g., about 70 wt % of the oil having lubricating viscosity, preferably at least about 90 wt % of the oil having lubricating viscosity, based upon the total of the composition, and a minor proportion of the carbonate overbased calcium sulfonate prepared by the method of the present invention. The overbased calcium sulfonate is easily blended into the oil of lubricating viscosity in the amount desired. Typically, the lubricating oil composition can contain from about 0.05 wt % to about 20 wt %, based upon the weight of the lubricating oil composition, cand preferably from about 0.1 wt % to about 10 wt % of the overbased calcium sulfonate, based upon the total weight of the lubricating oil composition.

It is contemplated that such lubricating oil composition can contain other additives which are used conventionally in lubricating oil compositions. Such other conventional additives include, but are not limited to, oxidation inhibitors, viscosity index improvers, dispersants, antifoam agents, pour point depressants, and similar additives.

The lubricating oil compositions that are prepared according to the present invention are useful for lubricating internal combustion engines, automatic transmissions, and as industrial oils, such as hydraulic oils and heat transfer oils. These lubricating oil compositions not only lubricate the engine in which they are being used, but also support cleanliness in the various lubricated parts in the internal combustion engine.

EXAMPLE I

A suitable vessel was charged with 58.6 g of a sulfonic acid derived from polybutene-1 alkyl benzene (analysis: 79.9% sulfonic acid, 18.0% oil and 2.1% calcium sulfate (sediment) and an equivalent weight for the sulfonic acid of 560), 78.4 g of 5W oil and 305 ml of technical grade hexane. The sulfonic acid was stirred and was then neutralized with gaseous ammonia. This was followed by the addition of 53 ml of methyl alcohol and 69.5 g of commercial grade calcium hydroxide with continuous mixing. The mixture was heated to reflux (123° F.) and $CO_2$ was added at a rate of about 0.29 g/min below the surface of the stirred mixture for about 89 minutes or 26.1 gm. During the carbonation, overheads were removed and fresh dry hexane and methanol were added back to the reaction mass. The details of this addition scheme were as follows:

| Time, min. | Temp., °F. | Overhead Removed | | Process Aids Added | |
|---|---|---|---|---|---|
| | | Hydro-carbon Layer, ml | MeOH/H$_2$O Layer, ml | Hexane ml | Methanol ml |
| 0 | 124 | — | — | — | — |
| 10 | 125 | 17.0 | 7.0 | — | — |
| 24 | 125 | 32.0 | 12.0 | — | — |
| 49 | 125 | 16.0 | 5.0 | 30.6 | 15.8 |
| 58 | 125 | 16.5 | 4.5 | — | — |
| 65 | 125 | — | — | 27.0 | 13.0 |
| 72 | 125 | 18.0 | 5.0 | — | — |
| 81 | 125 | 14.0 | 3.5 | 26.5 | 13.0 |
| 89 | 125 | 18.6 | 6.5 | — | — |

Most of the hexane, methanol and water were then removed by heating the mixture to 280° F. The crude product was diluted to 600 ml with fresh hexane and then clarified by centrifugation and polish filtration. The solvents were then removed, again yielding 165.7 g of a bright, clear, oily liquid which had the following analysis:

| Metal Ratio | 14.4 |
|---|---|
| Total Base No. | 350.1 |
| Viscosity, cs @ 210° F. | 913.2 |
| % Calcium Sulfonate | 27.5 |

The clarity of the product was exceptionally good.

It is important to point out that if most of the water is not removed from the reaction mass in the manner described, the product will be hazy and unsuitable as a lubricant additive.

EXAMPLE II

A suitable vessel was charged with 58.6 g of the sulfonic acid used above, 78.4 g of 5W oil and 305 ml of hexane. Mixing was begun and 53 ml of methanol was added followed by 69.5 g calcium hydroxide (note that in this preparation the sulfonic acid was not neutralized with ammonia). The mixture was then heated to reflux (124° F.) and CO$_2$ was added at a rate of 0.293 g per minute below the surface of the stirred mixture for about 70 mins or about 20.5 gm of CO$_2$. During the carbonation, overheads were removed and fresh dry hexane and methanol were added back to the reaction mass. The details were as follows:

| Time, min. | Temp., °F. | Overhead Removed | | Process Aids Added | |
|---|---|---|---|---|---|
| | | Hydro-carbon Layer, ml | MeOH/H$_2$O Layer, ml | Hexane, ml | Methanol, ml |
| 0 | 124 | — | — | — | — |
| 8 | 124 | 15.5 | 4.5 | — | — |
| 18 | 125 | 15.5 | 4.5 | — | — |
| 23 | 125 | — | — | 30.1 | 9.5 |
| 28 | 125 | 15.5 | 4.5 | — | — |
| 37 | 125 | 16.0 | 5.0 | — | — |
| 39 | 125 | — | — | 30.0 | 9.0 |
| 46 | 126 | 16.0 | 5.0 | — | — |
| 53 | 126 | 16.0 | 5.0 | — | — |
| 58 | 126 | — | — | 30.0 | 9.0 |
| 62 | 125 | 16.0 | 5.0 | — | — |
| 70 | 125 | 14.0 | 4.0 | — | — |

The remaining hexane, methanol and water were removed by heating to 280° F. The material was clarified by diluting to 600 ml with fresh hexane followed by centrifugation and polish filtration. This yielded 157.4 g of a sparkling clear oily liquid with the following properties:

| Metal Ratio | 11.6 |
|---|---|
| Total Base No. | 302.5 |
| Viscosity, cs @ 210° F. | 72.9 |
| % Calcium Sulfonate | 29.5 |

EXAMPLE III

The same charge and procedure was used as outlined in Example I or I above except that normal heptane was used instead of hexane. The carbonation details were as follows:

| Carbonation Time, min. | 88 |
|---|---|
| Carbonation Rate, gm/min. | 0.294 |
| Amount of CO$_2$, gm | 26.0 |

| Time, min. | Temp., °F. | Overhead Removed | | Process Aids Added | |
|---|---|---|---|---|---|
| | | Hydro-carbon Layer, ml | MeOH/H$_2$O Layer, ml | Hexane, ml | Methanol, ml |
| 0 | 138 | — | — | — | — |
| 9 | 147 | 10.0 | 10.0 | — | — |
| 16 | 142 | 10.0 | 10.0 | — | — |
| 20 | 142 | — | — | 20.0 | 18.1 |
| 26 | 142 | 10.0 | 10.0 | — | — |
| 31 | 142 | 10.0 | 10.0 | — | — |
| 35 | 142 | — | — | 20.3 | 17.8 |
| 37 | 142 | 10.0 | 10.0 | — | — |
| 41 | 142 | 10.0 | 10.0 | — | — |
| 44 | 142 | — | — | 19.7 | 18.1 |
| 48 | 142 | 11.0 | 11.0 | — | — |
| 51 | 142 | 9.0 | 9.0 | — | — |
| 54 | 142 | — | — | 20.2 | 18.5 |
| 56 | 141 | 10.0 | 10.0 | — | — |
| 62 | 142 | 10.0 | 10.0 | — | — |
| 66 | 152 | — | — | 19.9 | 18.1 |
| 70 | 142 | 10.0 | 10.0 | — | — |
| 76 | 142 | 10.0 | 10.0 | — | — |
| 79 | 142 | — | — | 19.9 | 18.0 |
| 84 | 141 | 10.0 | 10.0 | — | — |
| 88 | 142 | 7.5 | 7.5 | — | — |

Following carbonation, all of the methanol, heptane and water were removed by heating to 360° F. with a 5 CFH nitrogen strip. The product was filtered hot using 5% HYFLO filter aid. The very clear oily liquid had the following analysis:

| Metal Ratio | 14.4 |
|---|---|
| Total Base No. | 341.8 |
| Viscosity, cs @ 210° F. | 62.9 |
| % Calcium Sulfonate | 26.3 |

EXAMPLE IV

This preparation was the same as Example III above except that toluene was used as the solvent. The carbonation details were as follows:

| Carbonation Time, min. | 89 |
|---|---|
| Carbonation Rate, gm/min. | 0.29 |
| Amount of CO$_2$, gm | 26.1 |

| Time, min. | Temp., °F. | Single Phase Overhead Removed, ml | Process Aids Added Toluene, ml* | Process Aids Added Methanol, ml* |
|---|---|---|---|---|
| 0 | 151 | — | — | — |
| 14 | 152 | 20 | — | — |
| 31 | 154 | 20 | 9.1 | 29.6 |
| 38 | 151 | 22 | — | — |
| 44 | 152 | 21 | 9.0 | 30.0 |
| 49 | 152 | 24 | — | — |
| 55 | 152 | 18 | 9.0 | 31.2 |
| 63 | 150 | 18 | — | — |
| 70 | 151 | 20 | — | — |
| 73 | 151 | — | 9.1 | 29.8 |
| 80 | 150 | 20 | — | — |
| 85 | 150 | 20 | 9.3 | 31.2 |
| 89 | 149 | 10 | — | — |

*Process aids added based on theoretical azeotrope.

Following carbonation, the solvent, water and methanol were removed by heating to 360° F. with a 5 CFH nitrogen strip. The product was filtered hot using 5% HYFLO filter aid to yield a very clear oily liquid which analyzed as follows:

| | |
|---|---|
| Metal Ratio | 13.2 |
| Total Base No. | 294.8 |
| Viscosity, cs @ 210° F. | 46.2 |
| % Calcium Sulfonate | 25.0 |

EXAMPLE V

This preparation was also the same as Example III except that xylene was used as the solvent. The carbonation details were as follows:

| | |
|---|---|
| Carbonation Time, min. | 90 |
| Carbonation Rate, gm/min. | 0.293 |
| Amount of $CO_2$, gm | 26.3 |

| Time, min. | Temp., °F. | Single Phase Overhead Removed, ml | Process Aids Added Toluene, ml* | Process Aids Added Methanol, ml* |
|---|---|---|---|---|
| 0 | 155 | — | — | — |
| 9 | 157 | 20 | — | — |
| 26 | 159 | 20 | 7.3 | 31.4 |
| 34 | 156 | 20 | — | — |
| 41 | 159 | 20 | — | — |
| 43 | 163 | — | 6.1 | 32.8 |
| 48 | 155 | 21 | — | — |
| 50 | 159 | 21 | — | — |
| 62 | 162 | — | 4.9 | 32.6 |
| 69 | 155 | 20 | — | — |
| 81 | 155 | 20 | 4.9 | 33.1 |

*Process aids added based on theoretical azeotrope.

Following carbonation the residual solvent, water and methanol were removed by heating to 360° F. with a slot nitrogen gas strip. The crude product was filtered using 5% HYFLO filter aid add mix. The clear finished material had the following analysis:

| | |
|---|---|
| Metal Ratio | 13.6 |
| Total Base No. | 310.6 |
| Viscosity, cs @ 210° F. | 50 |
| % Calcium Sulfonate | 25.6 |

I claim:

1. A method for preparing a carbonate overbased calcium sulfonate which utilizes a single-stage carbonation, wherein the resulting overbased product has a metal ratio of at least about 10 and a TBN in the range of about 250 to 400, which method comprises: forming a first mixture consisting essentially of a lower molecular weight alkanol, an alkyl or alkaryl-substituted sulfonic acid or sulfonate compound, a diluent, and a solvent; (2) adding a calcium compound to said first mixture to form a second mixture in which the amount of added calcium is at least about 10 times the amount necessary to form a neutral calcium sulfonate; (3) heating the second mixture to its reflux temperature; (4) subjecting the second mixture to a single carbonation at said reflux temperature to form a carbonated product while simultaneously and continuously removing an overhead comprising water produced during the carbonation reaction; (5) after carbonation is stopped, heating the carbonated product to an elevated temperature sufficient to remove the alkanol; and (6) removing solids and solvent from the carbonated product to obtain the final overbased product.

2. The method of claim 1 wherein alkanol and solvent are removed along with water in the overhead obtained in step (4) and said alkanol and solvent are replaced.

3. The method of claim 1 wherein the alkanol is methanol and the solvent is an aliphatic solvent.

4. The method of claim 1 wherein the calcium compound is calcium hydroxide.

5. The method of claim 1 wherein the carbonation is conducted with carbon dioxide gas.

* * * * *